United States Patent
Dai et al.

(10) Patent No.: US 11,991,809 B2
(45) Date of Patent: May 21, 2024

(54) TECHNIQUES AND REMOTE CONTROL FOR WIRELESS CONTROL OF A SMART LAMP OR SMART ILLUMINATION SYSTEM

(71) Applicant: LEDVANCE GmbH, Garching bei Munchen (DE)

(72) Inventors: Yongchang Dai, Guangdong (CN); Huajin Huang, Guangdong (CN); Wang Jiang, Guangdong (CN); Yafen Zhang, Guangdong (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 17/976,083

(22) Filed: Oct. 28, 2022

(65) Prior Publication Data

US 2023/0090490 A1    Mar. 23, 2023

Related U.S. Application Data

(63) Continuation of application No. 16/123,606, filed on Sep. 6, 2018, now Pat. No. 11,490,494.

(30) Foreign Application Priority Data

Sep. 27, 2017 (CN) .......................... 201710889028.9

(51) Int. Cl.
 *H05B 47/19* (2020.01)
 *H05B 47/115* (2020.01)
(52) U.S. Cl.
 CPC ........... *H05B 47/19* (2020.01); *H05B 47/115* (2020.01)

(58) Field of Classification Search
 None
 See application file for complete search history.

(56) References Cited

U.S. PATENT DOCUMENTS

| | | | |
|---|---|---|---|
| 2013/0063344 A1 | 3/2013 | Obermuller et al. | |
| 2014/0078406 A1 | 3/2014 | Friedman | |
| 2015/0100323 A1 | 4/2015 | Kozuka et al. | |
| 2015/0355909 A1 | 12/2015 | Sallas et al. | |
| 2016/0150624 A1* | 5/2016 | Meerbeek | H05B 47/10 315/297 |
| 2017/0164448 A1* | 6/2017 | Jones | H05B 47/105 |
| 2018/0084106 A1 | 3/2018 | Li et al. | |
| 2018/0165951 A1 | 6/2018 | Kim et al. | |

FOREIGN PATENT DOCUMENTS

| | | | | |
|---|---|---|---|---|
| DE | 202004016868 U1 * | 4/2006 | ......... | H05B 37/0227 |
| WO | 2017107536 A1 | 6/2017 | | |

* cited by examiner

*Primary Examiner* — Dedei K Hammond
(74) *Attorney, Agent, or Firm* — Hayes Soloway PC

(57) ABSTRACT

A method for controlling an electronic device with a remote control includes detecting a motion of the remote control and determining a command associated with the detected motion. The determined command is sent from the remote control to the electronic device. A corresponding remote control includes a motion detector for detecting a motion of the remote control, a device for determining a command associated with the detected motion, and a transmitter for sending the determined command to the electronic device.

21 Claims, 3 Drawing Sheets

TECHNIQUES AND REMOTE CONTROL FOR WIRELESS CONTROL OF A SMART LAMP OR SMART ILLUMINATION SYSTEM

CROSS-REFERENCE TO RELATED APPLICATIONS

This patent application is a Continuation of U.S. patent application Ser. No. 16/123,606, filed on Sep. 6, 2018, which claims the benefit of and priority to Chinese Patent Application No. 2017108890289 filed on Sep. 27, 2017. Each of these patent applications is herein incorporated by reference in its entirety.

TECHNICAL FIELD

The present invention relates to a method for controlling an electronic device with a remote control, in particular by detecting a motion of the remote control.

BACKGROUND

Electronic devices, in particular so called "smart" devices, are becoming more and more ubiquitous in the daily life. All these devices need to be controlled somehow, even if they are too small to be provided with control elements or are installed in places where they are not easy to reach.

Controlling such devices by voice would be an option, but voice control either requires high processing power or a continuous connection to the internet for voice analysis.

Conventionally, electronic devices have been controlled by remote controls which provide a plurality of button to access various functions of the device. But remote controls having many buttons may be confusing and remote controls having only a small number of buttons may make controlling the device cumbersome, especially if the device does not have a display.

SUMMARY OF THE INVENTION

In view of the known prior art, it is an object of the present invention to provide a method for controlling an electronic device with a remote control and a corresponding remote control which overcome the problems mentioned above.

This object is solved by a method for controlling an electronic device with a remote control and a corresponding remote control according to the independent claims. Preferred embodiments are given by the dependent claims.

A method according to the present invention for controlling an electronic device with a remote control comprises the following steps:

In one step, the remote control detects a motion of the remote control. The motion can be a translational motion or a rotational motion of the remote control or a combination thereof. A motion of the remote control is understood to mean a motion of the remote control as a whole, not just simply one part of the remote control with respect to another part thereof. For example, pressing a button of the remote control or moving a control stick on the remote control is not considered to be a motion of the remote control. In particular, the motion can be a two-dimensional and/or a three-dimensional motion of the remote control in space.

In a further step, the remote control determines a command that is associated with the detected motion. The command is a command that is to be sent to the electronic device and that is intended to control behavior of the electronic device.

When the motion is two-dimensional, its relative orientation is space may be taken into account when determining the associated command or it may be ignored. For example, when the motion is a circle, a circle in a horizontal plane and a circle in a vertical plane may be associated with the same command or with different commands.

In a further step, the remote control sends the determined command to the electronic device. The command can be sent using known techniques such as infrared (IR) or radio (e.g. Bluetooth or ZigBee technology) transmission. The command may be sent using a string of bits representing the command. Sending the command may correspond to sending a command from a known remote control to an electronic device upon pressing a button on the remote control.

By using motion detection to identify the command to be sent, the remote control does not need to comprise many buttons (e.g., one for each command), rather a small number of buttons may be sufficient. In particular, the remote control may comprise one, two, or three buttons or it may even comprise no buttons. At the same time the remote control remains versatile and can detect and send a large number of commands.

The commands may be associated with motions of the remote control such that the user may intuitively perform the motion. This simplifies controlling the electronic device. For example, increasing a parameter, such as a light intensity of a lamp or a volume of a sound device, may be achieved by moving the remote control clockwise (as seen from the user) in a circle. Similarly, decreasing the parameter may be achieved by moving the remote control counterclockwise in a circle.

In another example, the motion may be heart-shaped and the associated command may be entering a romantic light setting for a lamp or an illumination system (such as smart lamps sold by LEDVANCE GmbH under the trademark Lightify).

In an embodiment, the method further comprises the step of bringing the remote control into a motion detecting state. Preferably, the remote control is brought into the motion detecting state by an action of the user before the motion of the remote control that is to be detected is being performed. This prevents accidental detection of a motion and sending of the associated command when no such command is intended to be sent by the user, for example, when the remote control is just placed somewhere else or is stored away. It furthermore helps to save energy, since the remote control does not have to keep a motion detecting element active at all times.

In an embodiment, the remote control may be brought into the motion detecting state by pressing a button on the remote control. The remote control may be kept in the motion detecting state as long as the button is pressed, i.e. until the button is released again. Alternatively, pressing and releasing the button may cause the remote control to enter the motion detecting state for a predetermined period of time, for example for 10 seconds. The remote control may also automatically leave the motion detecting state when no motion has occurred during a predetermined period of time, for example for 30 seconds.

The remote control may also be brought into the motion detecting state by switching the remote control on or by inserting batteries (or other storage device for electric energy) into the remote control. In such a case, the remote control may remain in the motion detecting state until it is switched off or until the batteries are removed again.

In an embodiment, detecting a motion of the remote control comprises detecting a translational motion of the remote control. In other words, a rotation of the remote control during its motion may be neglected. Essentially, only the position of a specific point of the remote control (such as its center of gravity or the position of a motion detecting element inside the remote control) in space may be taken into account when detecting the motion of the remote control. This simplifies using the remote control, since the user does not have to take care not to rotate the remote control while he is performing the motion, in particular when the motion includes curved portions.

In an embodiment, detecting a motion of the remote control comprises recording a motion pattern indicative of a motion of the remote control and determining a command associated with the detected motion comprises comparing the recorded motion pattern with one or more motion patterns stored in a memory of the remote control.

The detected motion pattern may be a series of spatial coordinates of the remote control or it may be a series (i.e. one or more) of movement vectors. The motion pattern may include or exclude the rotational orientation of the remote control and/or rotations vectors.

The comparison of the detected motion pattern with the motion patterns stored in the memory may take into account that a motion is not always performed in the same way or with the same amplitude (size). For example, the remote control may be moved in a circle each time with a different radius. Nevertheless, the same command is intended by the user and should be identified and sent to the electronic device. Accordingly, comparing the recorded motion pattern with one or more motion patterns stored in a memory of the remote control may include converting the recorded motion pattern into an abstract representation of the motion, for example normalizing the recorded motion pattern to a predetermined size.

Instead of comparing the full motion patterns, a numerical representation of the motion patterns (such as a hash value) may be compared. The motions patterns may also be stored only as numerical representations.

Preferably, the method for controlling an electronic device may be used for controlling a lighting device (such as a lamp or an illumination system).

The present invention also relates to a remote control for controlling an electronic device. The remote control comprises a motion detector (i.e. a motion detecting element) for detecting a motion of the remote control. The above explanations regarding the motion to be detected apply here as well. In particular, the motion detector may comprise at least one accelerometer such as the accelerometer available by STMicroelectronics under the type number MPU9250. The motion detector may be configured to detect translational motion in one, two, or three spatial dimensions. The motion detector may additionally or alternatively be configured to detect rotation around one, two, or three axes. The motion detector may be an axis magnetometer.

The remote control further comprises means for determining a command associated with the detected motion. The means for determining a command may be a microcontroller, in particular such as the microcontroller available by Silicon Labs under the type number EM3585. The means for determining a command may comprise one or more inputs for receiving electronic signals from the motion detector. For example, the motion detector may be connected to the means for determining a command and communicate therewith via a Serial Peripheral Interface (SPI) bus or via an Inter-Integrated Circuit (I2C) bus.

The remote control further comprises a transmitter for sending the determined command to the electronic device. The transmitter may be an infrared (IR) diode or a radio transmitter (such as a Bluetooth or ZigBee transmitter). The means for determining a command may comprise one or more outputs for sending electronic signals to the transmitter.

The means for determining a command, the motion detector, and the transmitter (any two or all three of them) may be integrated into a single unit. For example the means for determining a command may be a microcontroller with integrated ZigBee transmitter such as the microcontroller available by Silicon Labs under the type number EM3585.

In an embodiment, the remote control further comprises one or more buttons for bringing the remote control into a motion detecting state. The buttons may be connected to corresponding inputs of the means for determining a command.

Alternatively or additionally, the remote control may comprise a switch for bringing the remote control into the motion detecting state. In such a case, the remote control may be in the motion detecting state as long as the switch is in a motion detection position, or the remote control may leave the motions detecting state if not motion is detected within a predetermined time period (e.g., 30 seconds) in order to save energy.

In an embodiment, the remote control further comprises at least one accelerometer for detecting a translational motion of the remote control. Each accelerometer may be configured to detect translational motion in one, two, or three spatial coordinates. Preferably, the remote control may comprise a single accelerometer configured to detect translational motion in three spatial coordinates, i.e., in three dimensions.

In an embodiment, the remote control further comprises a memory configured to store one or more motion patterns. The means for determining a command associated with the detected motion may then be configured to record a motion pattern indicative of a motion of the remote control into said memory or into another memory and to compare the recorded motion pattern with the motion patterns stored in the memory. The memory configured to store one or more motion patterns may be a non-volatile memory, in particular a flash memory. If another memory is used for storing the recorded motion pattern, said other memory may be volatile, but it can also be non-volatile.

The remote control may also be configured to allow a user to record motion patterns and/or to associate commands for the electronic device to pre-recorded motion patterns or to motion patterns recorded by a user. To record a motion pattern, the user (if necessary) brings the remote control into the motion detecting state and moves the remote control along a motion pattern that is to be recorded. The recorded motion pattern may then be stored in the memory of the remote control.

To associate commands for the electronic device to pre-recorded motion patterns or to motion patterns recorded by a user, the user selects the motion pattern and the command that is to be associated with the motion pattern. Associating commands to motions patterns may be carried out using an additional configuration device, such as a computer or smartphone running a corresponding application and being connectable to the remote control, either wirelessly (e.g. WiFi, Bluetooth, etc.) or via a cable. The associations defined by the user are preferably stored in a memory of the remote control. The additional configuration device may also be used for bringing the remote control into the motion detecting state.

The remote control may also be configured to be locked using motion control, such that the remote control cannot be used (for example by another user or inadvertently) to control the electronic device. To lock the remote control, the user (if necessary) brings the remote control into the motion detecting state and moves the remote control along a locking pattern. The locking pattern may be predefined or it may be definable by the user. To unlock the remote control, the user (if necessary) brings the remote control into the motion detecting state and moves the remote control along an unlocking pattern. The locking pattern may be the same as the unlocking pattern or locking pattern and unlocking pattern may be different patterns. It is also considered that motion detection is used only for locking or for unlocking the remote control and that unlocking or locking, respectively, is achieved in a different way, for example by pressing one or more buttons.

The present invention also relates to a system comprising an electronic device and a remote control as explained above for controlling the electronic device. The system may comprise more than one electronic device. One or more of the electronic devices may be configured to be controlled by the remote control by using motion detection as described above.

Preferably, the electronic device is a lighting device, i.e., a lamp or an illumination system (such as smart lamps sold by LEDVANCE GmbH under the trademark Lightify).

Features mentioned in this description with respect to a device may also be employed for the corresponding methods. Vice versa, features mentioned in this description with respect to a method may also be employed for the corresponding devices.

BRIEF DESCRIPTION OF THE DRAWINGS

Preferred embodiments of the invention will be explained in the following, having regard to the drawings. It is shown in.

DETAILED DESCRIPTION OF THE INVENTION

In the following, preferred embodiments of the invention will be described with reference to the drawings. The same or similar elements or elements having the same effect may be indicated by the same reference number in multiple drawings. Repeating the description of such elements may be omitted in order to prevent redundant descriptions.

Figure 1:
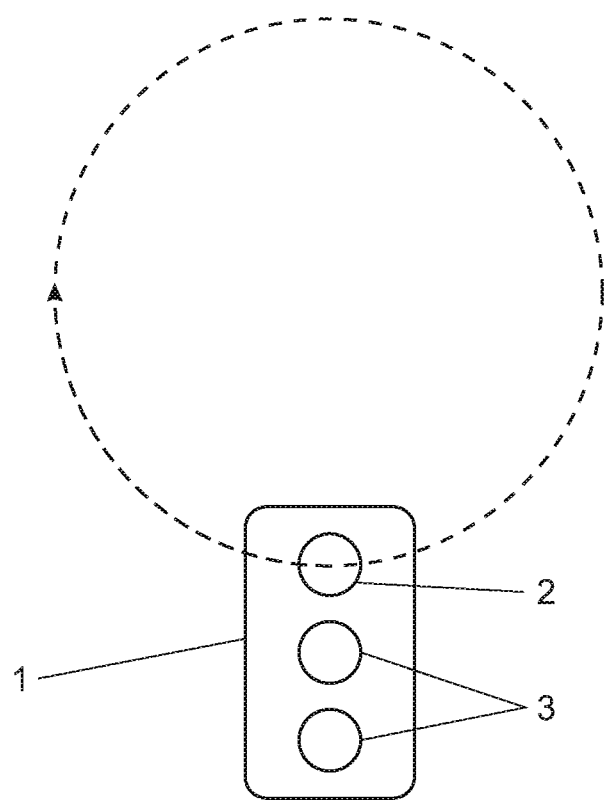
FIG. 1 a schematic illustration of an embodiment of a method according to the present invention.

FIG. 1 shows a schematic illustration of using a remote control 1 according to the present invention in a method according to the present invention. The remote control 1 comprises three buttons 2, 3. One of the buttons 2 is used for bringing the remote control 1 into a motion detecting state.

The other two buttons 3 may be used for directly choosing commands and sending said commands to an electronic device (not shown), such as switching on and off the electronic device. The remote control 1 may also comprise only two or more than three buttons 2, 3.

The remote control 1 may be brought into a motion detecting state by pressing and holding the corresponding button 2. The remote control 1 may be configured such that, while the button 2 is being pressed, the motion of the remote control 1 is being detected and analyzed and a corresponding command is sent to the electronic device. For example, when the remote control 1 is in the motion detecting state and is moved clockwise along a circle (as shown in FIG. 1), a command to increase a parameter may be sent to the electronic device. As an example, the electronic device may be a lamp such as a smart lamp and the command may be to increase the brightness of the lamp.

Figure 2:
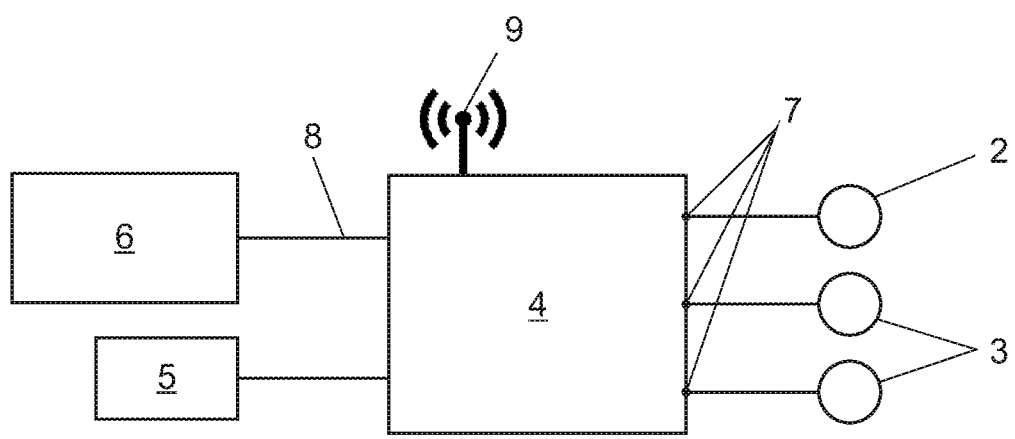
FIG. 2 a schematic illustration of a hardware architecture diagram of an embodiment of a remote control according to the present invention.

FIG. 2 shows a schematic illustration of a hardware architecture diagram of an embodiment of a remote control 1. The remote control 1 may comprise a microcontroller 4. An accelerometer 6 may be connected to the microcontroller, in particular using a bus 8 such as an SPI bus or an I2C bus. The microcontroller 4 may receive electronic signals indicative of a motion of the remote control 1 (i.e. a motion pattern) from the accelerometer 6 and use these signals to determine the motion of the remote control 1.

In order to determine a command associated with the motion pattern, the remote control 1 may compare the detected motion pattern with motion patterns stored in a memory 5. The memory 5 may be part of the microcontroller 4 or it may be a separate component connected to the microcontroller 4.

The buttons 2, 3 of the remote control are connected to corresponding inputs 7 of the microcontroller 4, so that the microcontroller 4 may recognize when a button 2, 3 is being pressed. One of the buttons 2 may be used for bringing the remote control 1 into a motion detecting state.

Once the microcontroller 4 has determined a command associated with the motion of the remote control 1, the command may be sent to an electronic device via a transmitter 9 (such as a Bluetooth or ZigBee transmitter). The transmitter 9 may be part of the microcontroller 4 or it may be a separate component connected to the microcontroller 4.

Figure 3:
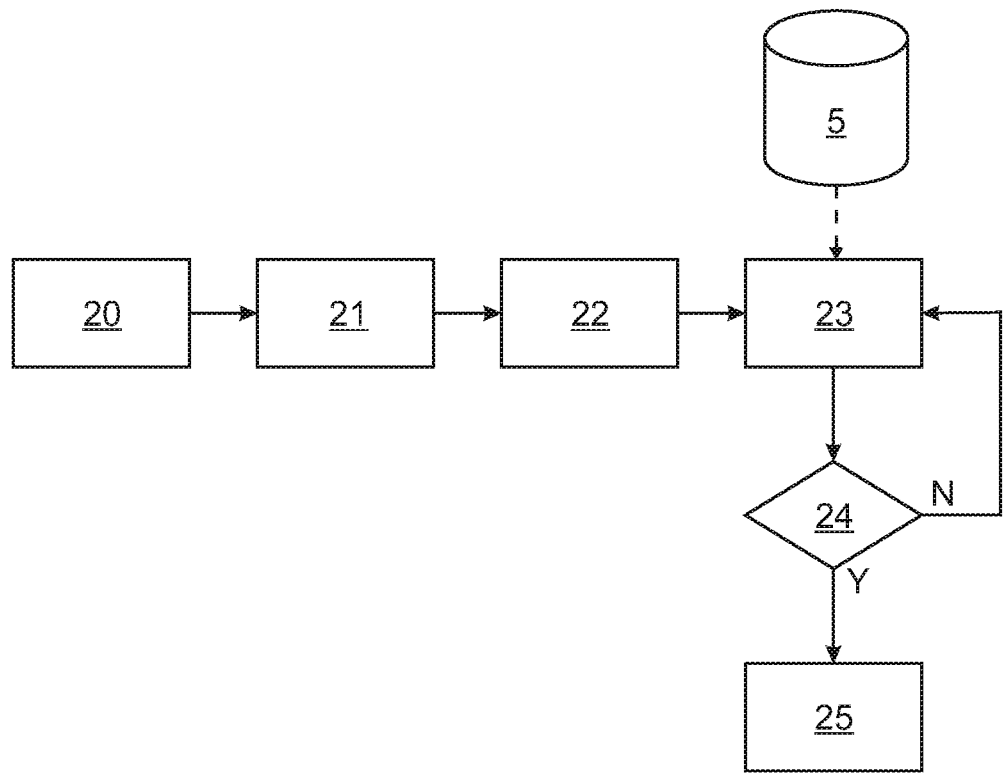
FIG. 3 a flow diagram of an embodiment of a method for controlling an electronic device with a remote control according to the present invention.

FIG. 3 illustrates, using a flow diagram, an embodiment of a method for controlling an electronic device with a remote control 1 using motion detection. At 20, the remote control 1 is brought into a motion detecting state, for example by pressing and holding a corresponding button 2. At 21, while the button 2 is kept pressed, the remote control 1 is being moved by the user along a desired path. The motion of the remote control is detected by a motion detector 6 (such as an accelerometer) and corresponding electronic signals are provided to a microcontroller 4 at 22 as a motion pattern. At 23, the microcontroller reads a stored motion pattern from a memory 5 of the remote control 1. The detected motion pattern and the motion pattern read from the memory 5 are compared at 24. If the two motion patterns match within a predetermined degree (exit Y), the command associated with the motion pattern (also stored in the memory 5) may be sent to an electronic device at 25. If the two motion patterns do not match (exit N), the method returns to step 23 and the next stored motion pattern is read from the memory 5. If the detected motion pattern does not match any of the stored motion patterns, no command is sent to the electronic device.

Figure 4:
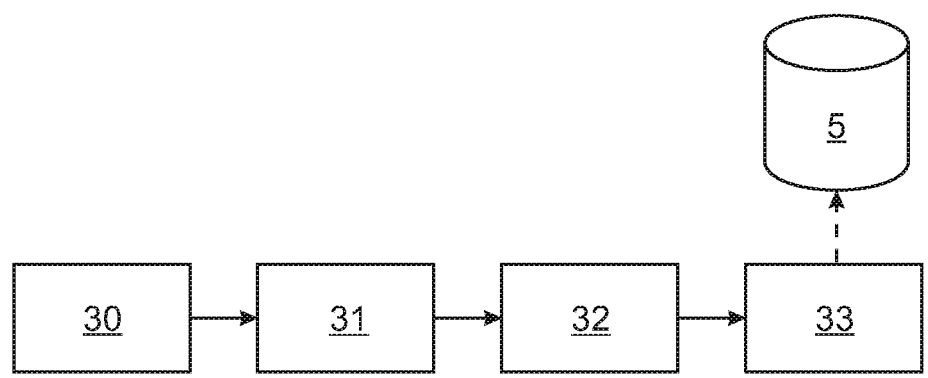
FIG. 4 a flow diagram of an embodiment of a method for associating a motion with a command for a remote control according to the present invention.

FIG. 4 illustrates, using a flow diagram, an embodiment of a method for associating a motion with a command for a remote control. At 30, the remote control 1 is brought into a motion detecting state, for example using a smartphone (not shown) wirelessly connected to the remote control (for example via Bluetooth) and running a configuration application. At 31, while the remote control 1 is in the motion detecting state, the remote control 1 is being moved by the user along a desired path. The motion of the remote control is detected by a motion detector 6 (such as an accelerometer) and corresponding electronic signals are provided to a microcontroller 4 at 32 as a motion pattern. At 33, the detected motion pattern is stored in a memory 5 of the remote control, preferably together with an associated command that is to be sent to an electronic device. The associated command may be chosen using the smartphone.

Figure 5:
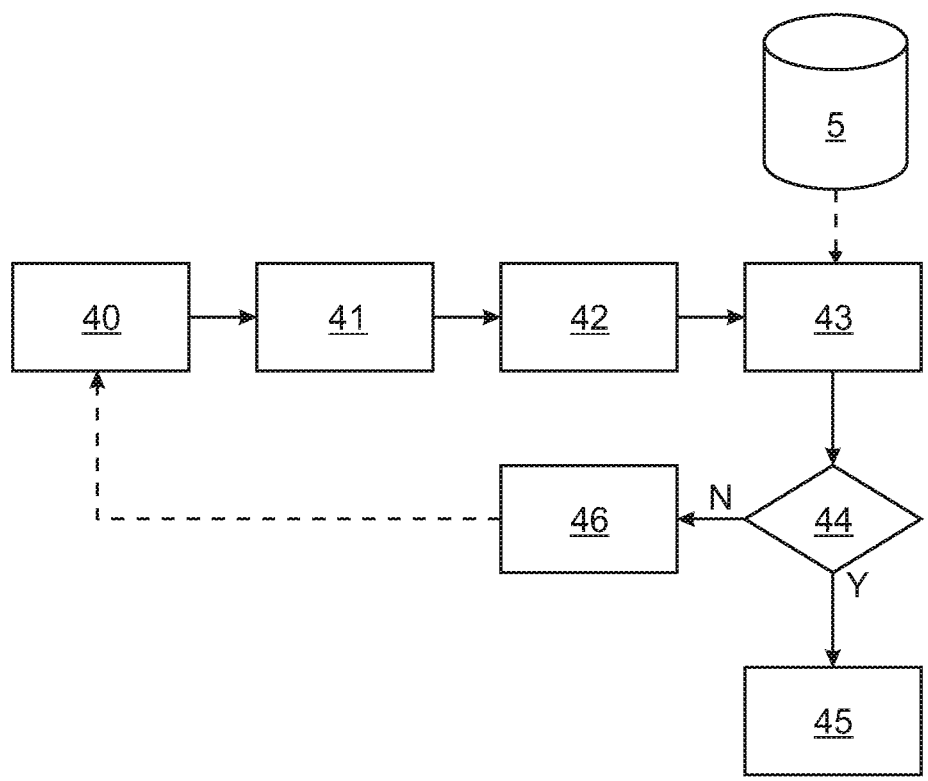
FIG. 5 a flow diagram of an embodiment of a method for unlocking a remote control according to the present invention.

FIG. 5 illustrates, using a flow diagram, an embodiment of a method for unlocking a remote control. At 40, the remote control 1 (being in a locked state, in which it does not send commands to an electronic device) is brought into a motion detecting state, for example by pressing and holding a corresponding button 2. At 41, while the button 2 is kept pressed, the remote control 1 is being moved by the user along a desired path. The motion of the remote control is detected by a motion detector 6 (such as an accelerometer) and corresponding electronic signals are provided to a microcontroller 4 at 42 as a motion pattern. At 43, the microcontroller reads a stored unlocking motion pattern from a memory 5 of the remote control 1. The detected motion pattern and the motion pattern read from the memory 5 are compared at 44. If the two motion patterns match within a predetermined degree (exit Y), the remote control 1 is brought into an unlocked state at 45 and may be used for controlling an electronic device. If the two motion patterns do not match (exit N), the remote control 1 remains in the locked state at 46. The user may start the unlocking again at step 40.

If the remote control remains in the locked state, a corresponding signal (for example, a visual signal such as lighting of an LED in the remote control 1 or an audible signal produced by a speaker or a piezo element in the remote control) may be output at 46. Similarly, if the unlocking is successful and the remote control 1 is brought into the unlocked state a corresponding signal may be output at 45.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

LIST OF REFERENCE NUMERALS 1 remote control
2 button
3 buttons
4 microcontroller
5 memory
6 accelerometer
7 inputs
8 bus
9 transmitter
20-45 method steps

What is claimed is:

1. A method of programming a remote control configured for wireless control of a smart lamp or smart illumination system, the method comprising:
bringing the remote control into a motion-detecting state in which the remote control can detect movement of the remote control;
detecting movement of the remote control along a user-designated movement path;
providing at least one electronic signal to a controller element of the remote control, wherein the at least one electronic signal is indicative of the detected movement of the remote control along the user-designated movement path;
storing the detected movement as a recorded movement pattern on the remote control; and
associating the recorded movement pattern with a control command for the smart lamp or smart illumination system stored on the remote control.

2. The method of claim 1, wherein bringing the remote control into the motion-detecting state comprises:
receiving at least one signal from an external computing device communicatively coupled with the remote control.

3. The method of claim 2, wherein the at least one signal comprises at least one of a Bluetooth signal and a Wi-Fi signal.

4. The method of claim 3, wherein the external computing device is a smartphone or computer.

5. The method of claim 4, wherein the at least one signal is provided through operation of a configuration application on the smartphone or computer.

6. The method of claim 1, wherein bringing the remote control into the motion-detecting state comprises at least one of:
operating a physical control feature of the remote control;
turning on the remote control; and
coupling a power source with the remote control.

7. The method of claim 6, wherein the physical control feature comprises a button on the remote control.

8. The method of claim 7, wherein operating the physical control feature comprises:
pressing and releasing the button before detecting movement of the remote control along the user-designated movement path can occur.

9. The method of claim 7, wherein operating the physical control feature comprises:
holding the button in a pressed state while detecting movement of the remote control along the user-designated movement path occurs.

10. The method of claim 1, further comprising:
terminating the motion-detecting state after a predetermined amount of time has elapsed.

11. The method of claim 1, further comprising:
terminating the motion-detecting state when no movement of the remote control has been detected after a predetermined amount of time has elapsed.

12. The method of claim 1, wherein the recorded movement pattern comprises a series of spatial coordinates of the remote control.

13. The method of claim 1, wherein the recorded movement pattern comprises a series of movement vectors of the remote control.

14. The method of claim 1, wherein the control command adjusts a parameter of a light output of the smart lamp or smart illumination system.

15. The method of claim 14, wherein the parameter of the light output comprises at least one of a light intensity and a lighting theme.

16. A remote control configured to perform the method of claim 1, the remote control comprising:
- a motion detector configured to detect the movement of the remote control along the user-designated movement path;
- memory configured to store:
  - the detected movement as the recorded movement pattern; and
  - the control command associated with the recorded movement pattern; and
- the controller element.

17. The remote control of claim 16, further comprising a transmitter device configured to transmit the control command in a wireless control signal to the smart lamp or smart illumination system.

18. A method of programming a remote control configured for wireless control of a smart lamp or smart illumination system, the method comprising:
- detecting movement of the remote control along a user-designated movement path;
- providing at least one electronic signal to a controller element of the remote control, wherein the at least one electronic signal is indicative of the detected movement of the remote control along the user-designated movement path;
- storing the detected movement as a recorded movement pattern on the remote control, wherein the recorded movement pattern comprises at least one numerical representation of the detected movement; and
- associating the recorded movement pattern with a control command for the smart lamp or smart illumination system stored on the remote control.

19. The method of claim 18, wherein the at least one numerical representation comprises a hash value.

20. A remote control configured to perform the method of claim 18, the remote control comprising:
- a motion detector configured to detect the movement of the remote control along the user-designated movement path;
- memory configured to store:
  - the detected movement as the recorded movement pattern; and
  - the control command associated with the recorded movement pattern; and
- the controller element.

21. The remote control of claim 20, further comprising a transmitter device configured to transmit the control command in a wireless control signal to the smart lamp or smart illumination system.

* * * * *